US012644279B2

(12) United States Patent
Williams

(10) Patent No.: US 12,644,279 B2
(45) Date of Patent: Jun. 2, 2026

(54) ACCESS PANEL AND METHOD OF MANUFACTURE

(71) Applicant: Gabriel Williams, Winchester, VA (US)

(72) Inventor: Gabriel Williams, Winchester, VA (US)

( * ) Notice: Subject to any disclaimer, the term of this patent is extended or adjusted under 35 U.S.C. 154(b) by 454 days.

(21) Appl. No.: 18/169,294

(22) Filed: Feb. 15, 2023

(65) Prior Publication Data

US 2024/0060302 A1 Feb. 22, 2024

Related U.S. Application Data

(63) Continuation of application No. 18/086,358, filed on Dec. 21, 2022.

(60) Provisional application No. 63/332,451, filed on Apr. 19, 2022.

(51) Int. Cl.
*E04B 9/00* (2006.01)
*E04B 9/04* (2006.01)

(52) U.S. Cl.
CPC ................ *E04B 9/003* (2013.01); *E04B 9/04* (2013.01); *E05Y 2900/131* (2013.01)

(58) Field of Classification Search
CPC ....... E04B 9/003; E04B 9/04; E05Y 2900/131
See application file for complete search history.

(56) References Cited

U.S. PATENT DOCUMENTS 5,255,479 A * 10/1993 Shepherd ................ E04F 19/08 49/449
7,568,318 B1 * 8/2009 Egan ....................... E04C 2/296 52/309.7

(Continued)

FOREIGN PATENT DOCUMENTS

CA 2661937 A1 * 3/2008 ............. B32B 13/14
CA 2892839 C * 2/2016 ............. E05D 15/00

(Continued)

OTHER PUBLICATIONS

UP Ceilings, Phantom Panels, Jan. 23, 2021, www.upceilings.com (retrieved via web.archive.org), p. 1-3, 5-7 and 14-22. (Year: 2021).*

(Continued)

*Primary Examiner* — Jessie T Fonseca
(74) *Attorney, Agent, or Firm* — McDonald Hopkins LLC

(57) ABSTRACT

An access panel system for providing access into a space behind a surface is disclosed. The system comprises an access panel frame adapted to be disposed in a corresponding opening in the surface. The frame may be formed from a first sheet of drywall. The access panel frame has an upper frame surface, a lower frame surface and a frame opening. The frame opening may be formed by milling a section from the sheet of drywall. The system further comprises an access panel comprising an upper piece formed from a second sheet of drywall and a lower piece. The upper piece may be glued to the lower panel. The upper piece may be dimensioned relative to the lower piece to form a lip extending about the periphery of the upper piece. And the lower piece may be laterally dimensioned to fit into the frame opening, and the lip may be adapted to engage the upper frame surface.

1 Claim, 10 Drawing Sheets

(56) References Cited

U.S. PATENT DOCUMENTS

| | | | | | |
|---|---|---|---|---|---|
| 7,650,722 | B1 * | 1/2010 | Melesky | E04F 11/062 52/198 |
| 7,836,638 | B2 * | 11/2010 | Ogieglo | E06B 5/01 52/745.15 |
| 9,631,407 | B2 * | 4/2017 | Wise | E05D 7/12 |
| 2006/0258284 | A1 * | 11/2006 | Melesky | E04B 9/003 454/349 |
| 2009/0277099 | A1 * | 11/2009 | Ogieglo | E06B 5/01 52/745.15 |
| 2012/0082839 | A1 * | 4/2012 | Ha | E01C 5/065 428/221 |
| 2012/0186179 | A1 * | 7/2012 | Melesky | E04B 9/001 52/404.4 |
| 2014/0137498 | A1 * | 5/2014 | Melesky | E06B 3/70 52/404.4 |
| 2016/0123068 | A1 * | 5/2016 | Wise | E04F 19/08 49/504 |
| 2018/0038155 | A1 * | 2/2018 | Melesky | E04B 1/7608 |

FOREIGN PATENT DOCUMENTS

| | | | | | |
|---|---|---|---|---|---|
| CA | 3217242 | A1 * | 11/2022 | C04B 11/00 |
| CN | 207211474 | U * | 4/2018 | |
| CN | 112443074 | A * | 3/2021 | E04B 9/003 |
| DE | 102019125138 | A1 * | 3/2021 | E04B 9/003 |
| EP | 1903162 | A1 * | 3/2008 | E04B 9/003 |
| EP | 1911496 | A2 * | 4/2008 | A62C 2/06 |
| GB | 2456646 | A * | 7/2009 | E04B 9/003 |
| WO | WO-9419147 | A1 * | 9/1994 | B23Q 1/032 |
| WO | WO-2007014786 | A1 * | 2/2007 | E04B 9/00 |

OTHER PUBLICATIONS

Walls & Ceilings, Grabber CNC-enabled PanelMax Hybrid, Mar. 27, 2018, www.wconline.com, p. 1. (Year: 2018).*

* cited by examiner

ACCESS PANEL AND METHOD OF MANUFACTURE

BACKGROUND

An access panel, or access door, to provide access from an exterior space, such as a room, into an interior space, such as above a drywall ceiling or behind a drywall wall, in the room, is known. Often it is desired that the access panel be generally discreet and concealed, visually blending into the surrounding surface, when viewed from the room.

An access panel may be one component of what may be referred to as an access panel system. The access panel system may also include an associated frame. The access panel may have a stepped profile, comprising a flanged portion and a stepped portion, the stepped portion being preferably centered relative to the flanged portion. The frame may have a frame opening corresponding in shape and size to the shape and size of the stepped portion of the associated access panel, but having dimensions slightly greater, to permit the frame opening to receive the stepped portion of the access panel to fit into the frame opening.

Typically to install such an access panel system in a ceiling, such as a drywall ceiling, an opening slightly larger than the frame may be cut into the drywall ceiling. The frame may then be conventionally installed within the opening, and a conventional butt joint may be installed in the gap between the frame and the opening. The access panel may then be placed in, and supported by, the frame.

An access panel system may be similarly installed in a wall, such as a drywall wall, although a hinged mechanism may be required, as is known.

Certain of such access panels have conventionally been formed of Glass-Fiber-Reinforced Gypsum (GFRG). As is known, such GFRG panels may typically be formed in a mold, removed, and then have m their edges sanded. This can be a time-consuming process. This process may also require a dedicated mold for each panel size, thereby limiting size flexibility and options for such access panels. Panels made of GFRG may also have a relatively high moisture content, which may potentially lead to formation of mold, they may be somewhat fragile, and may potentially sag. As a result, panels made of GFRG have a relatively high material and production cost.

One solution is disclosed in co-pending U.S. patent application Ser. No. 18/086,358, filed on Dec. 22, 2022. While this solution has proven to be successful in many applications, certain problems are presented when the size of the access panel becomes large, such as of the order of 24", or greater.

The present disclosure is provided to address these and other problems.

SUMMARY

It is an object of the present disclosure to provide a method of forming an access panel, and associated frame, such as from sheets of conventional drywall.

It is a further object of the present disclosure to provide an access panel, and associated frame, according to such a method.

This and other objectives and advantages may become apparent from the following description taken in conjunction with the accompanying Figures.

DESCRIPTION OF THE PREFERRED EMBODIMENT

Figure 1:
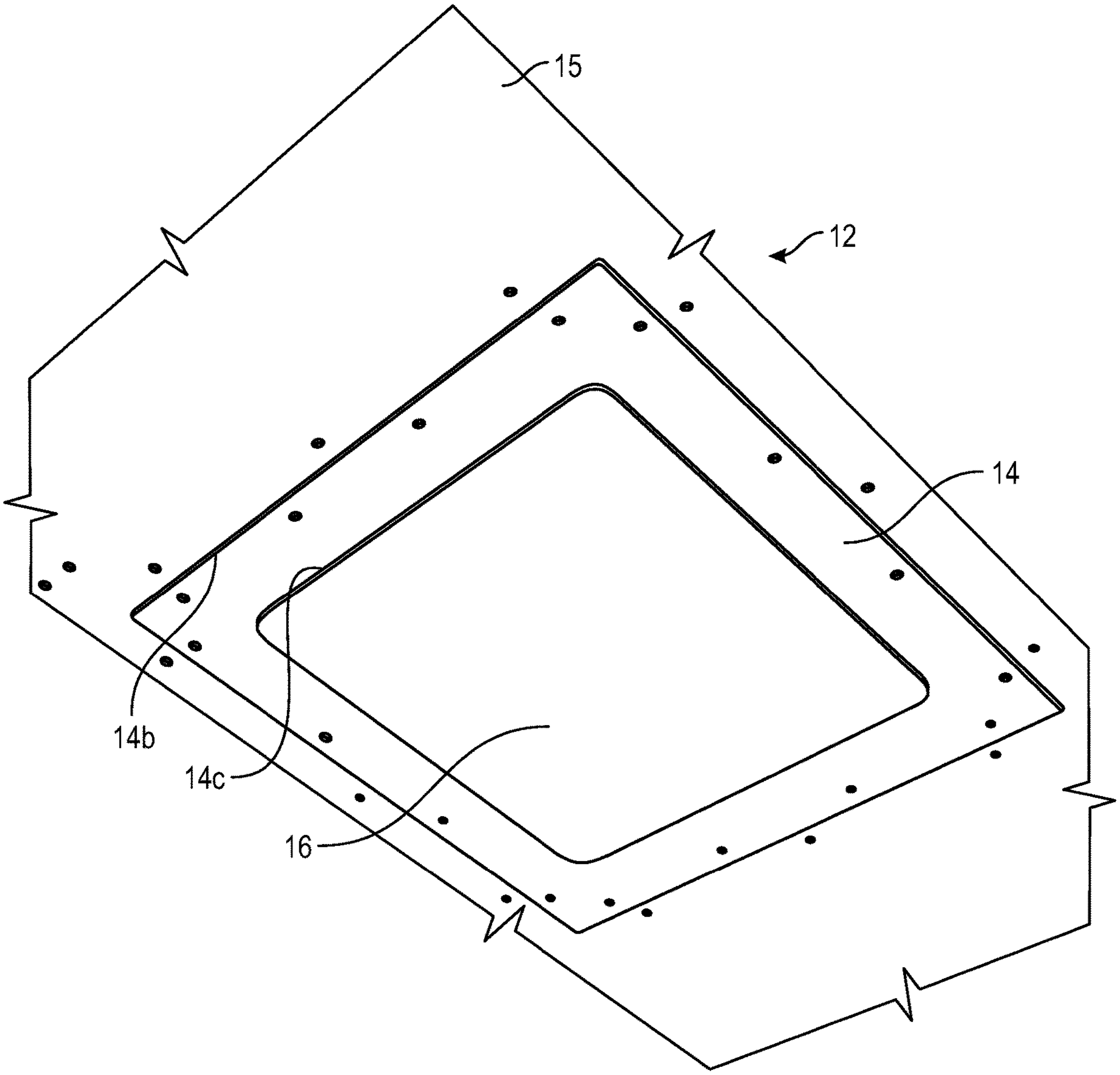
FIG. 1 is a perspective view of an access panel system, installed in a ceiling, in accordance with the present invention.
Figure 2:
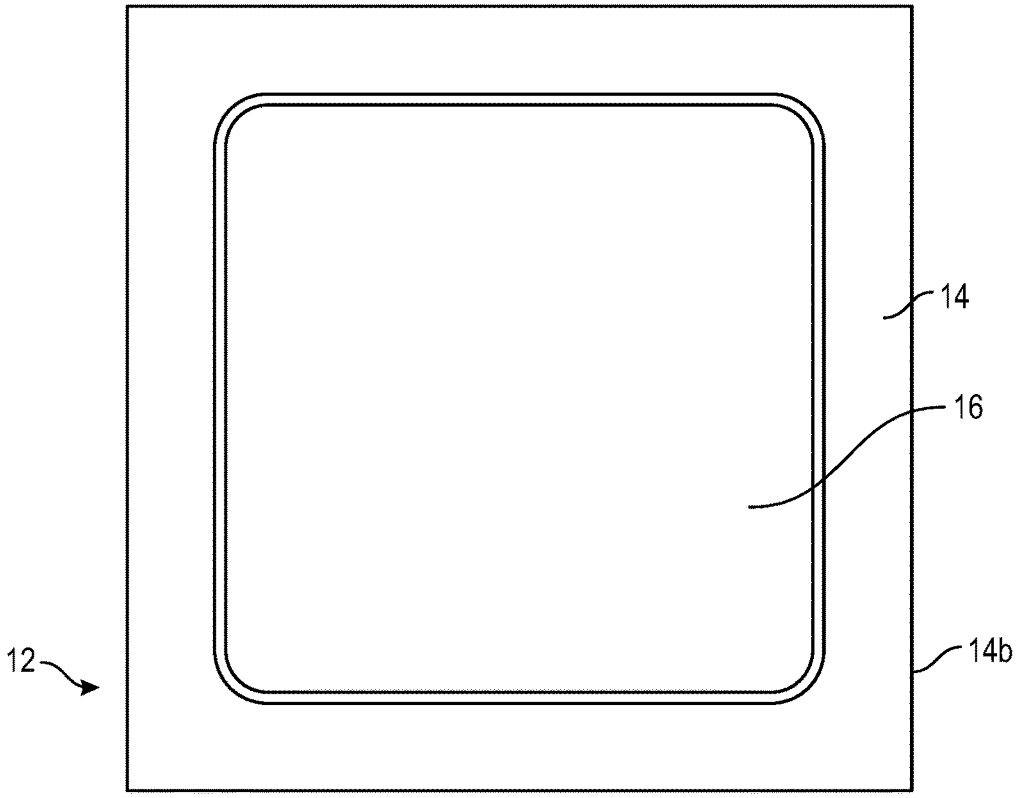
FIG. 2 is a plan view of the access panel system of FIG. 1.

While this invention is susceptible of embodiments in many different forms, there will be described herein in detail, specific embodiments thereof, with the understanding that the present disclosure is to be considered an exemplification of the principles of the invention and is not intended to limit the invention to the specific embodiments illustrated.

The present method may utilize a Flextos Supercut CNC Automated Milling and Sawing Table (the milling machine), manufactured by Flextos GmbH of Raubling, Germany. The Supercut CNC is available in the US as the Hybrid CNC/PanelMax ST48, distributed by Grabber Construction Products. Alternative conventional CNC milling machines may also be utilized.

In accordance with one embodiment of the present invention, an access panel system 12 may include an access panel frame 14 having a frame opening 14*a*, into which an access panel 16 may be positioned. The frame 14 may be conventionally installed in an opening of a ceiling 15, such as a conventional drywall ceiling. Conventional drywall ceilings of commercial buildings are typically formed of ⅝" thick drywall. Conventional drywall ceilings of residential buildings are typically formed of ½" thick drywall. The access panel frame 14 and the access panel 16 may preferably be formed of conventional drywall. As is known, conventional drywall is significantly less expensive than GFRG. A sheet of drywall typically is formed of a gypsum core, covered on opposing sides by a layer of paper 18—a face paper on a side which is typically the outwardly facing side (when installed) of the drywall sheet and a backing paper on the opposing side, which side is typically the inwardly (when installed) facing side of the drywall sheet.

The frame 14 is preferably of substantially the same thickness as the ceiling 15 into which it will be installed. Accordingly, if the frame 14 is for installation in a ⅝" thick ceiling, it may be formed by milling a section from a first sheet of conventional ⅝" (0.63") drywall, to form the frame opening 14*a* within the frame 14. Similarly, for installation in a ½" thick ceiling, the frame 14 may be formed by milling a section from a first sheet of conventional ½" drywall. The exterior facing edge of the periphery of the frame 14 may be shaped, such as rounded with a 1/16" radius, to permit a better, more aesthetic finished joint with the ceiling 15.

As discussed in greater detail below, the access panel 16 may be formed in a two-step milling process, by milling a second sheet of conventional drywall, preferably a single sheet of 1" thick drywall, such as what is commonly referred to as shaft liner, to form the access panel 16 having a stepped profile comprising a flanged portion 16*a*, which may be 0.37" in height, and a stepped portion 16*b*, which may be 0.63" in height, which corresponds to the thickness of the frame 14). The stepped portion 16*b* is adapted to fit through the frame opening 14*a*, and the flanged portion 16*a* is adapted to rest on an upper surface 14*b* of the frame 14, such that the exterior facing (when installed) surface of the frame 14 is substantially flush with the exterior facing surface (when installed) of the access panel 16. The dimensions of the frame opening 14*a* (i.e., the dimension of the section removed from the first sheet of drywall) may be slightly larger than the corresponding dimensions of the stepped portion 16*b*, so as to provide a peripheral gap between the frame opening 14*a* and the stepped portion 16*b* of 0.06".

Figure 5:
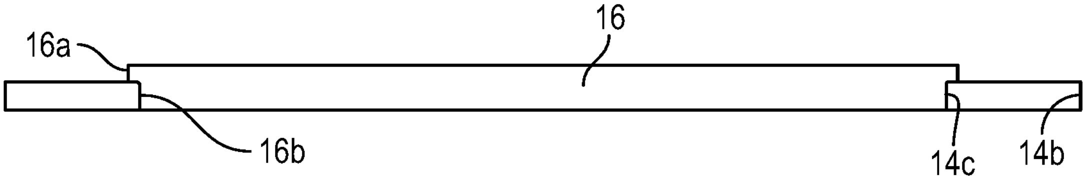
FIG. 5 is a sectional view of the access panel of FIG. 4.
Figure 5A:
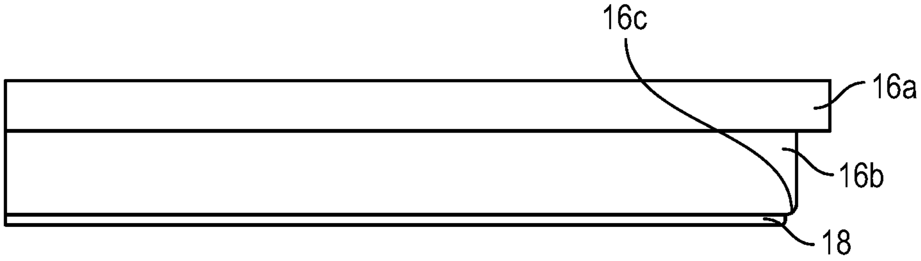
FIG. 5*a* is a detailed view of the access panel of FIG. 5.
Figures 6, 7:
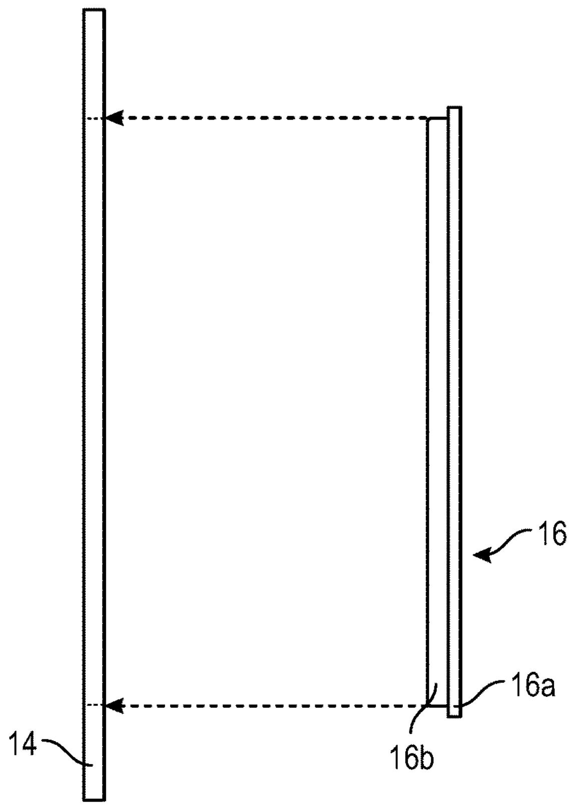
FIGS. 6 and 7 are respective side views of the frame and access panel of the present invention.
Figure 8:
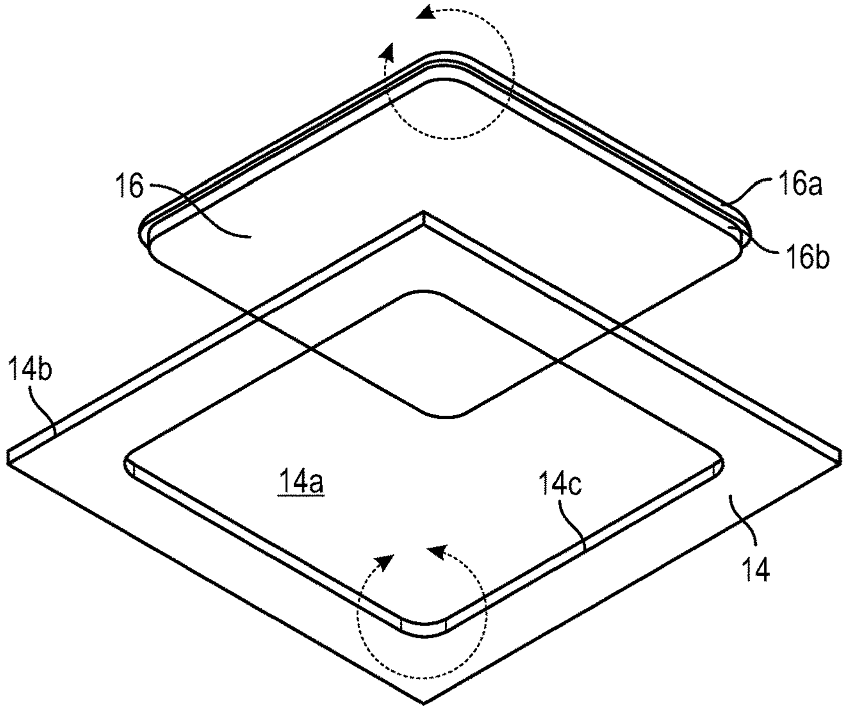
FIG. 8 is an exploded view of the access panel system of FIG. 1.
Figure 9:
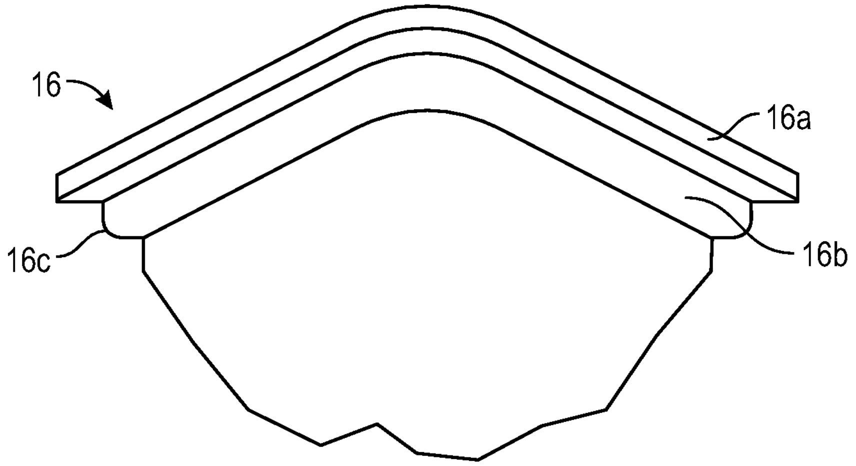
FIG. 9 is a detailed view of a rounded corner of the access panel of FIG. 8.
Figure 10:
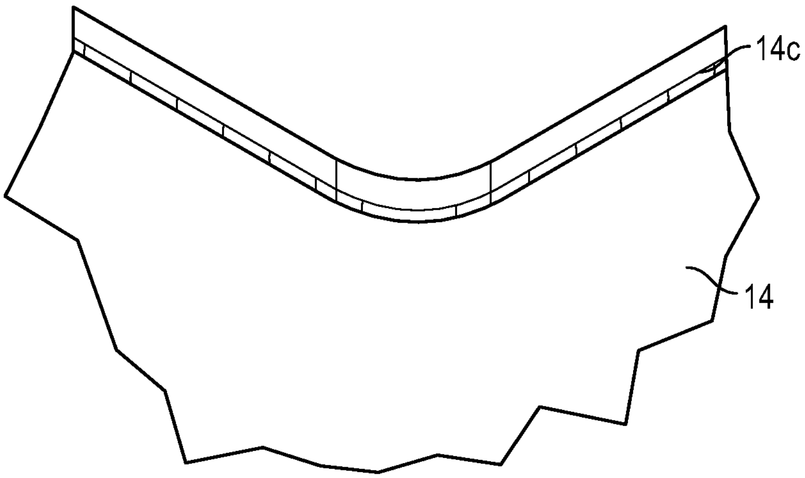
FIG. 10 is a detailed view of a rounded inner corner of the frame of FIG. 8

Following the milling step, milled edges of the milled drywall, particularly the corners, may be sanded and then sealed, as needed, by an application of a sealant such as a conventional drywall primer, such as to seal the junction between the drywall interior core and the drywall paper. But as discussed below, and as illustrated in FIG. 5*a*, the milling bit utilized to form the stepped portion 16*b* may preferably provide a shaped, preferably rounded, edge, such as a rounded edge having a radius of the order of 1/8"-1/16", reducing or otherwise eliminating a tendency for the drywall paper 18 to tear, thereby eliminating the need for the sanding step.

The following is a detailed description of one embodiment of manufacturing a version of the access panel 16 to fit into the frame opening 14*a* of the associated frame 14. In this embodiment, the access panel 16, and the frame opening 14*a* of the associated frame 14 are generally square. However it is to be understood that other geometries, such as a rectangle or a circle, are contemplated.

According to this embodiment, the flanged portion 16*a* of the access panel 16 is generally square, having 18.52" sides, but having generally rounded corners having a radius of 1.25". The stepped portion 16*b* is also generally square, having 18.02" sides, with rounded corners having a radius of 1.25". This provides a lip of approximately 0.25" extending about the periphery of the access panel 16. The actual dimension of the lip may be modified as needed.

The frame 14 may be generally square, having 24.08" sides and squared corners. The frame opening 14*a* may also be generally square, having 18.08" openings, and rounded corners having a radius of 1.25". The frame 14 has an outer peripheral edge 14*b*, which may be shaped, such as rounded, on its interior facing edge, such as to a 1/16" radius, which may help make a better finished join when installed in the ceiling. The frame 14 has an inner peripheral edge 14*c*, which defines the frame opening 14*a*. The inner peripheral edge 14*c* may also be shaped, such as rounded, on its interior facing edge, such as to a 1/16" radius.

Utilizing the milling machine, creation of the drywall access panel 16 may begin in CAD software. As discussed below, when milling a drywall sheet with a rotary bit having a cutting surface, the bit should be positioned such that the bit's cutting surface is positioned where the drywall cut is desired to be.

Drawing the Panel 16 in the CAD Software

According to the present embodiment, a square two-dimensional sketch may be made (i.e., coordinates may be plotted) measuring 18.52"×18.52" (the dimension of the flanged portion 16*a* of the access panel 16). Note: for different sizes the formula would be blank number 0.95. The sketch may be filled to create a panel. A second square sketch is made measuring 18.02"×18.02" (the dimension of the stepped portion 16*b* of the access panel 16). Note: for different sizes the formula would be blank number 0.02. The second square sketch may be placed within the large sketch (in the software), establishing a critical dimension of 0.25" [(18.52"−18.02")/2] between the outside of the inner square and inside of the larger square. This will maintain even spacing between the inner and outer square. Once aligned, corner chamfers may be added. These chamfers may help with rigidity of corner edging, as well as provide a more aesthetic appearance of the access panel 16. A 1.25" radius may be added with a conditional formula to apply the radius to each corner of the stepped portion 16*b* of the panel 16, and a 1.50" radius may be added with a conditional formula to apply the radius to each corner of the flanged portion 16*a* of the panel 16. The inner panel is now finished three-dimensionally but must be transposed into a two-dimensional part for it to be read by the CNC software. The drawing may be translated into an idw file from an ipt file. The idw file may allow lines of the door to be exported to a dxf file for interpretation by the CNC software.

Drawing the Frame 14 in the CAD Software

Figure 3:
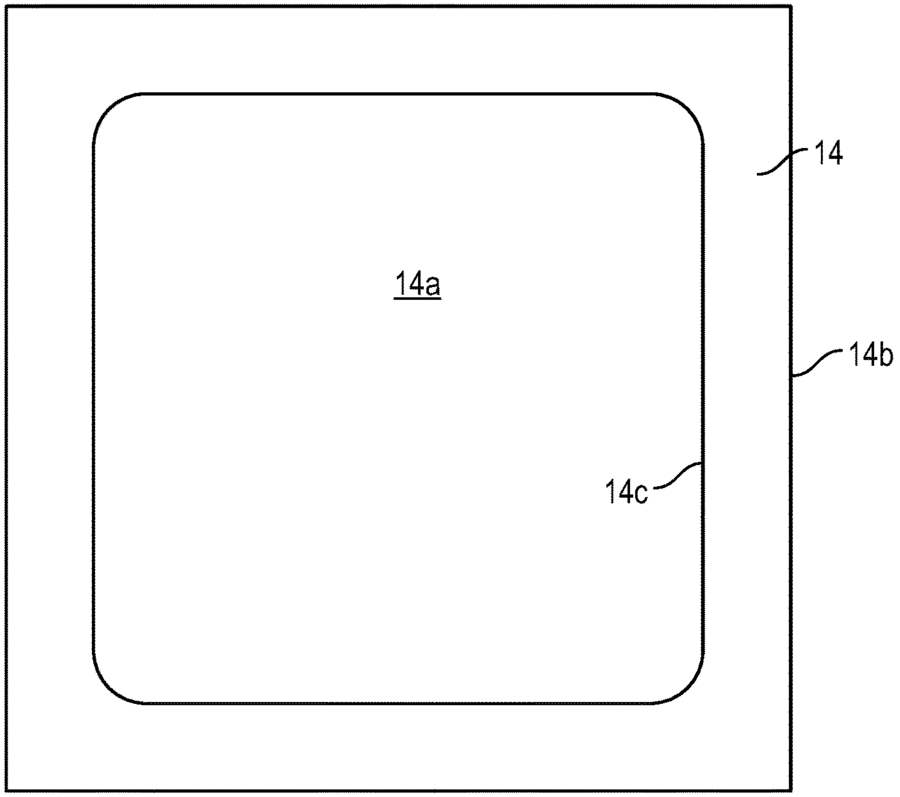
FIG. 3 is a plan view of a frame having a frame opening, as a component of the access panel of FIG. 1.
Figure 4:
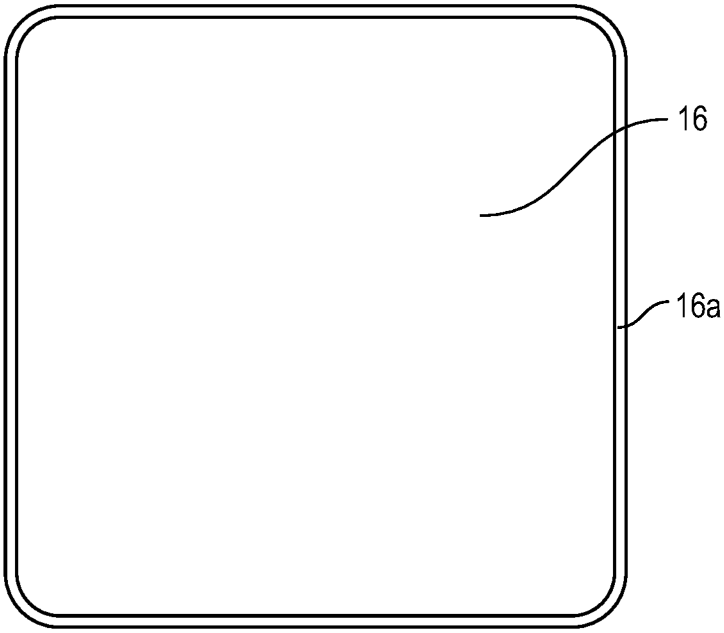
FIG. 4 is a plan view of an access panel, as a component of the access panel system of FIG. 1.

In the instant embodiment, the frame 14 may be three inches greater in outside dimension than the access panel 16, for the frame 14 to be properly mounted to ceiling joists and still allow proper operation of the access panel 16. See FIG. 3.

The frame 14 may start with a square that may be approximately six inches greater than the size of the associated access panel 16. Therefore, an ~18"×18" panel preferably requires a ~24"×24" frame. Right now, there is a panel that is 24 inches×24 inches, a cut needs to be made within the part in order for the panel to lock into place. A new sketch may be made measuring 18.06"×18.06". There is roughly a 0.06" gap between the frame 14 and panel 16 when the product is complete. This is the difference of the 18.08" (frame measurement) and 18.02" (panel measurement). The radii within this cut are nearly a 0.010" difference to that of the panel in order to maintain consistency and symmetry. The frame 14 may then be exported into a two-dimensional drawing. Both of the dxf files are then uploaded into ESTLcam, the programming software of the particular machine. Only one part (one of the access door 16 and the frame 14) can be programmed at a time since each part is made out of a different thickness of drywall.

The first part to program may be for the milling is the panel 16. One important part is creation of the stepped portion 16*b* via a special milling operation. In the program a 12 mm (0.47") bit is selected to mill 5/8" deep of the 1" thick drywall. The 12 mm bit cuts a 12 mm wide slot. Thus to mill the 1" thick drywall to form the 18.02" (across) stepped portion 16*b*, the programming must position the 12 mm bit on the inside of the outside measurement of 18.95". During this operation, the operator may line up the milling bit to the measurement of a depth of 5/8. Once the bit may be aligned to 5/8", a zero point may be is selected. This may be important to the process of creating a panel 16 because it is how the next bit to cut will align. Once a zero point is selected an operator can begin the cut of the stepped portion 16*b*. When the bit is cutting, paying proper attention to the cutting is important, for monitoring dust interference and accuracy. Depth gauges may be used to check the ⅝" depth cut within the 1" shaft liner board.

Once the cut forming the stepped portion has been completed, the router head may be removed, and a new router head may be placed with a bit having a length of 1" (to cut all of the way through the 1" sheet of drywall). Returning to the program, the 1 inch cutting bit may be selected to cut on the outside of the 18.52" measurement (so as to leave 18.52" of material). It is important that while programming, the zero has to stay the same or the dimensions will not line up. It should be noted that manual changing of the bit may be eliminated, such as by utilizing a milling machine having an auto-changing bit or a double router-head.

The bit selected for cutting the stepped portion 16*b* must also be deleted after the spacing of the door is correct. If the first bit is not deleted from the program, the machine may rerun the first bit geometric spacing and ruin the cutting, and for multiple door spacing the first bit may be needed to create the same space between doors but then may be deleted once the doors are aligned for the second bit program.

After the panel 16 is completed, it may be removed. A sanding block may then be used to ensure burr free paper edges of the door, if needed, however the front is generally finished. A round paint brush may then be used to remove any leftover drywall dust on the edges of the panel. Leaving this dust may interfere with flushness of the panel 16 within the frame 14. Once all dust is removed, a square paint brush, sponge foam brush, or the like may be used to apply the sealant to the cut surface of the stepped portion 14*b*. This will minimize or prevent cracking of the drywall and create a smooth durable surface for handling. The access panel 16 is now finished.

Milling of the Frame 14

The 1" drywall is removed, and ⅝" drywall board is physically uploaded. The frame 14 now needs to be programmed. Within the program, one may upload the dxf file of the frame 14 and select a 1" bit to cut the outside 24" measurement and inside of the 18.08" measurement. The starting cut of the inside of the frame 14 must begin on a flat contour or cut. If it begins on a corner when it starts and finishes it may actually hit the completed part during its exit cut. It is important that the 18.08 measurement cut is not on the frame side but of the leftover scrap piece or cut where the access panel will go. Before beginning the cut, the operator may preferably check the bit as constant bit changing may create misalignments in the cutting head. The bit must also be aligned so that the chamfer where the bit begins is at the top of the cutting head so that when it cuts the frame the paper is cut perfectly. Once the operator has checked the alignment the frame is good to run. The frame 14 may then be removed, and the drywall sealant may be applied to the inside and outside cut surface. The sealed access panel 16 and frame 14 may then be allowed to dry, such as for an hour or so.

Because the access panel 16 is formed of drywall, it can be painted or otherwise finished, to better visually blend into the surrounding surface, such as the surrounding ceiling or wall.

Larger Panels

Access panels having a dimension of the order of 24" (inches)×24" (inches), and greater may be required in certain applications to allow access to a larger internal construction instrument/panel or for an individual to more readily move through. It is noted that in such situations, ceiling joists, which are typically spaced apart between 16" and 24", may have to be relocated.

As is known, one-inch-thick shaft liner, such as used in the aforementioned method, is typically only commercially available in widths of 24", and having rounded edges. Thus, only approximately 22" inches of the shaft liner can be used for the creation of drywall panels by the aforementioned method, thereby eliminating an ability to make a panel greater than 22".

In accordance with another embodiment of the present invention, the following describes a method to create a drywall access panel, herein designated 16', which may be greater than 22" across, such as one having a dimension of 24"×24", or greater, such as for larger size applications, while still utilizing commercially available sheets of drywall. It should be understood the following methods may also be used for making smaller access panels.

Figure 11A:
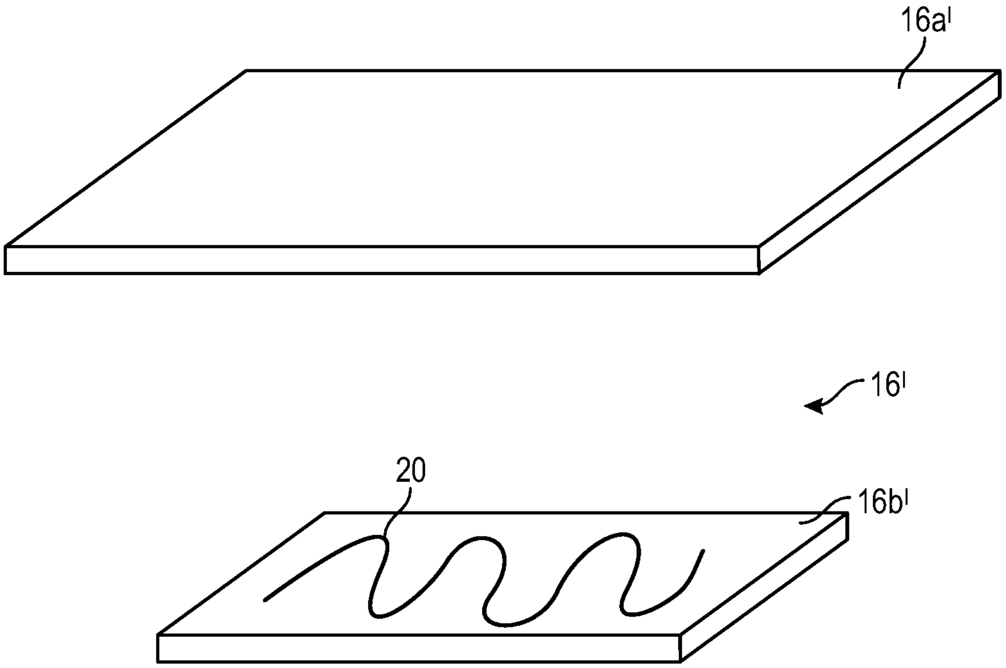
FIGS. 11A-11C are detailed views of another embodiment of the present invention.
Figure 11B:
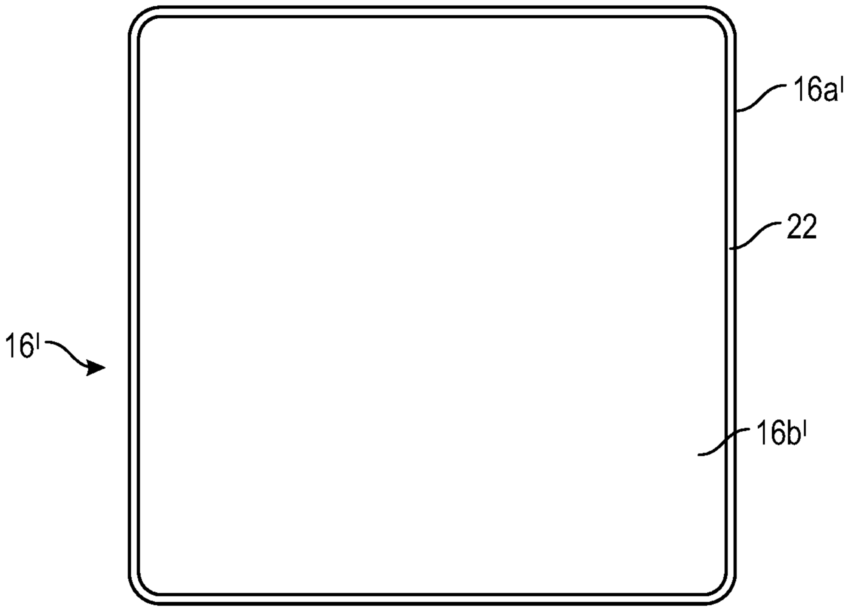
Figure 11C:
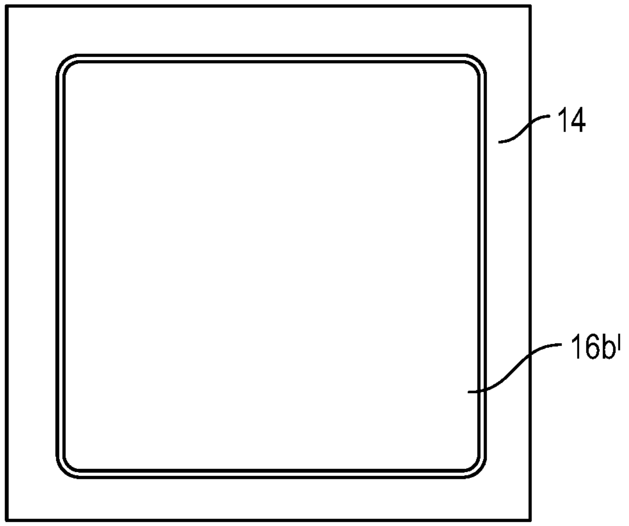
Figure 12A:
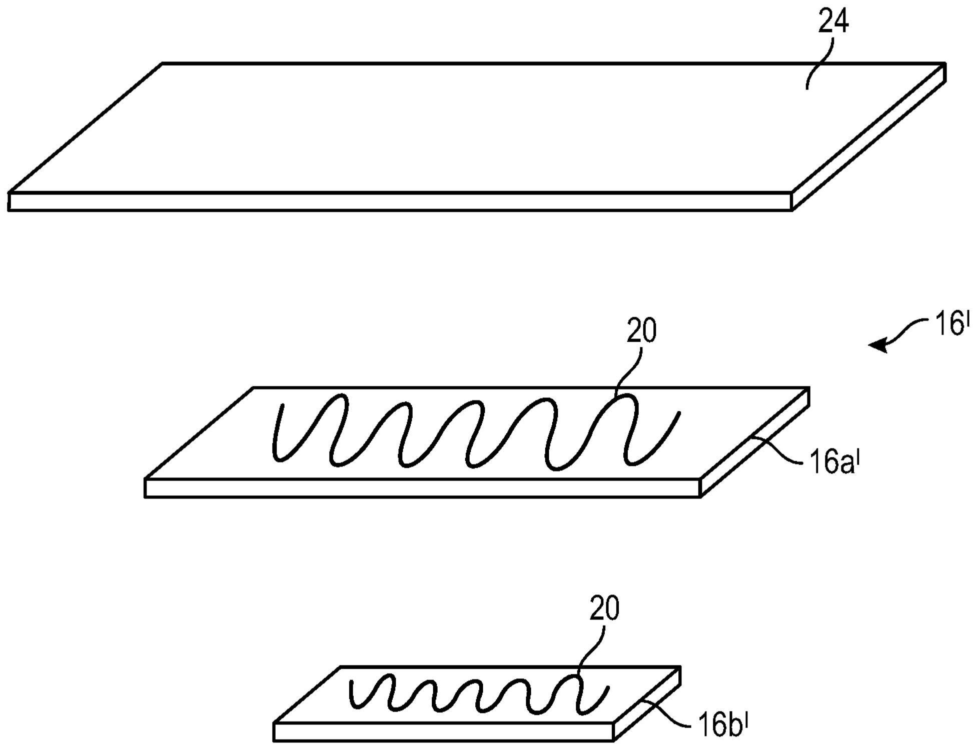
FIGS. 12A-12D are detailed views of another embodiment of the present invention.
Figure 12B:
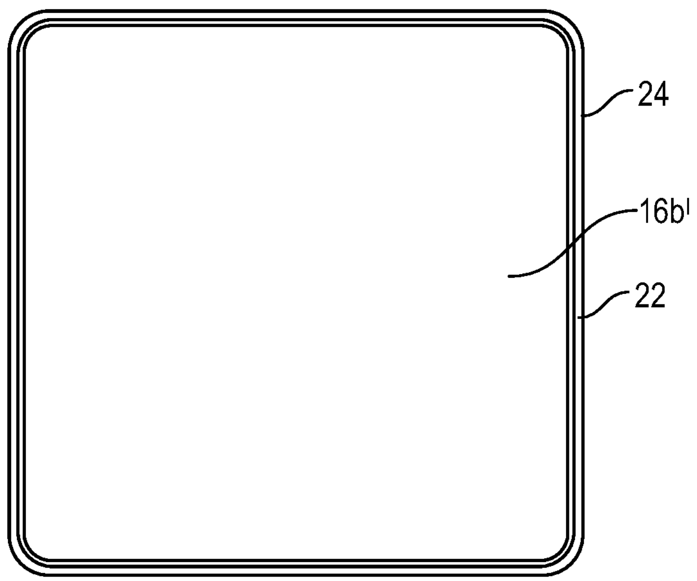
Figure 12C:
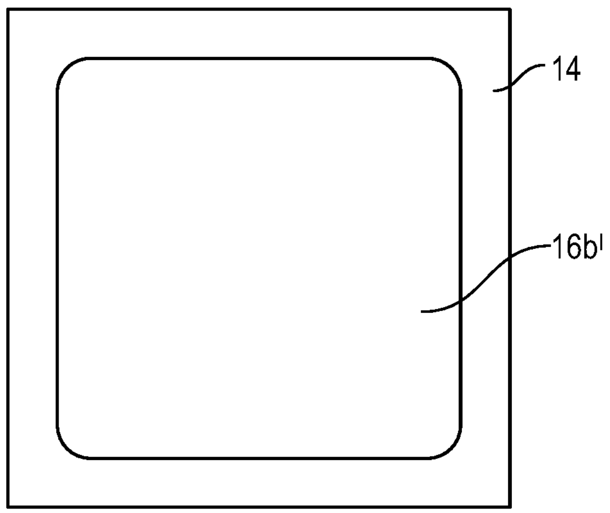
Figure 12D:
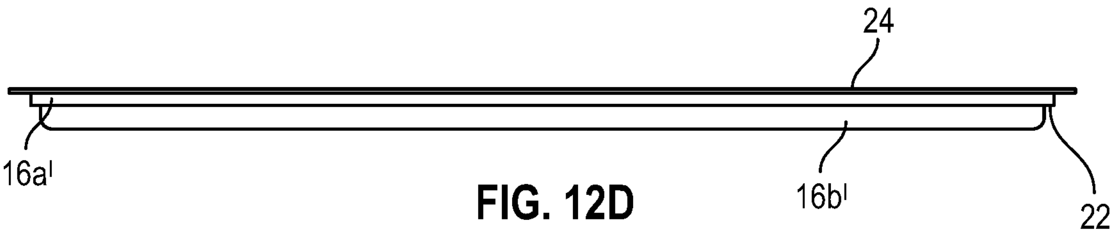

Referring to FIGS. 11A-11C, the panel 16' of this embodiment may have the same profile as the previously described smaller panel 16 but may be created differently to accommodate the supply constraint of conventional one-inch-thick shaft liner. Specifically, as discussed below, rather than forming the panel 16 from a single sheet of one-inch-thick drywall, the panel 16' may be formed of two pieces, an upper piece 16*a'* corresponding to the flanged portion 16*a* described above, and a lower piece 16*b'* corresponding to the stepped portion 16*b* described above, which two pieces may be secured together, such as by a bead 20 of conventional construction glue, forming the access panel 16'. Alternatively, the two pieces may be secured together by drywall anchors, however finishing of the exposed side of the lower portion may be required. The bead 20 is shown applied to the upper side of the lower piece 16*b*, though it may instead be applied to the lower side of the upper piece 16*a'*, or to both the upper side of the lower piece 16*b'* and the lower side of the upper piece 16*a'*. The upper piece 16*a'* may be dimensioned relative to the lower piece 16*b'*, to provide a lip 22 of approximately 0.25" about the periphery of the upper piece 16*a'*. As with the previously disclosed embodiment, the dimension of the lip 22 may be modified as needed.

As illustrated in FIGS. 11A-11C, to begin creation of the panel 16' according to this embodiment, a design may be created through the same methodology as the smaller panel 16, discussed above. However instead of cutting a single panel, having a thickness of one inch, and having a stepped peripheral edge, the two panels of drywall may be created, the lower piece 16*b'* having a thickness such as ⅝" (such as for placement in a ⅝" thick ceiling), and the upper piece 16*a"* having a thickness of the order of ⅜", and the upper and lower pieces 16*a'*, 16*b'*, may be glued together, such as utilizing the bead 20 of conventional construction glue, resulting in an effectively unitary structure having the desired stepped profile. For placement in a ½" thick ceiling 15, such as a residential ceiling, the lower piece 16*b'* may be formed from a ½" thick sheet of drywall.

Specifically, once the design is completed, a flat pattern may be exported of the front face of the panel (24.02"). Then a flat pattern may be exported of the back side of the panel (24.52"). A flat pattern may also be exported of the frame 14'. As of right now, there are three units to the assembly: the lower portion 16*b'* (or front of the panel 16'), the upper portion 16*a'* (or back of the panel 16'), and the frame 14'.

To begin the production process of the three parts, the cutting coordinates of the frame 14' and front of the panel may be uploaded into the CNC software. The frame 14' and front panel may be created with the same thickness of drywall, ⅝. The front panel may be nested (placed, in CNC terms) within the frame to mitigate costs and save time but a smaller router bit must be used to maintain correct dimensional spacing as to avoid cutting into part geometry.

It is important to watch the cut and ensure that everything is being cut to proper specifications. Once the frame 14' and the front panel **16*b* have been cut, one may measure with a tape measure or calipers to check measurements. Next, the back panel dxf may be uploaded onto the CNC system for cutting. The back panel 16*a*' may be cut out of ⅜" drywall. Once the ⅜" back panel 16*a*' has been cut, construction grade glue such as a liquid nails may be applied to the back panel 16*a*'. It is preferred to apply a bead that is roughly ¾" in height and which may can be spread within the panel crossing 23 inches×23 inches using a conventional zig zag method. Once the glue has all been applied, the front panel 16*b*' may be placed as such where it is creating the step shape and a 0.25" edge is left on all four sides. A jig may be created to expedite alignment each time, to not require measurement. Once aligned, the assembly may be pressed together using conventional clamps, a press either hydraulic or manual, or also a vacuum bag system. Depending on the construction glue used, it can either take approximately 24 hours for curing or instant bonding once pressed. After the glue has cured, the panel 16' is complete as one unit, and the edging may be sealed with drywall primer. The frame 14'** may be sealed as well and both parts may be inspected for any burred edging and any burred edges may be sanded to ensure a smooth finish.

In another embodiment, as illustrated in FIGS. 12A-12D, a backing 24 may be similarly glued to the upper portion **16*a*'. The backing 24 may be a metallic material, such as aluminum or steel, concrete board (a/k/a cement board), paperboard, plastic, carbon fiber, wood, composite, or the like. As such larger panels 16' can be relatively heavy and somewhat unwieldly to install, the backing 24 of this embodiment may be relatively light weight and may be utilized to provide protection of the edges of the access panel 16' during installation. If aluminum is utilized as the backing 24, the backing 24** may be a 0.04" thick sheet of aluminum. As is known, 0.04" is a commercially available thickness of sheet aluminum.

Figure 13A:
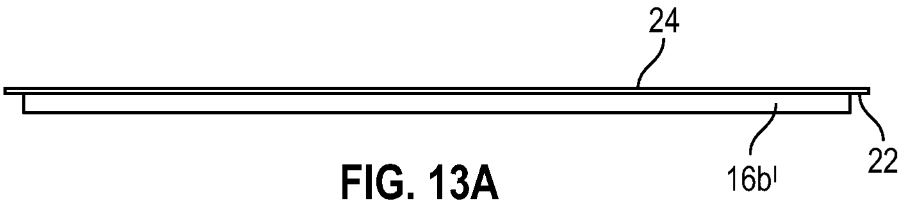
FIGS. 13A-13C are detailed views of another embodiment of the present invention.
Figure 13B:
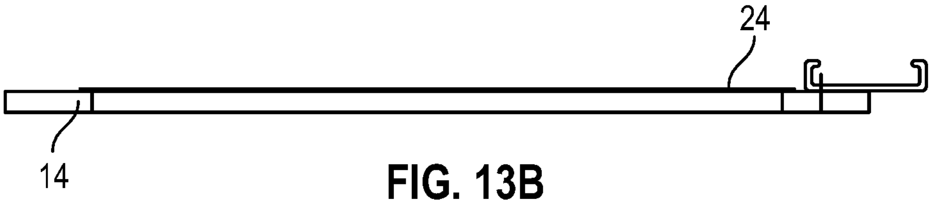
Figure 13C:
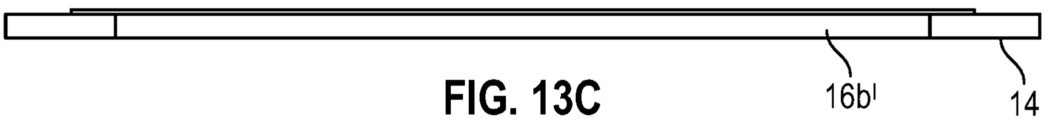

In another embodiment of the invention, as illustrated in FIGS. 13A-13C, the backing 24 may be secured directly to the upper side of the lower portion **16*b*', and the backing 24 may support, and thus bear the weight, of the lower portion 16*b* within the frame 14'. According to this embodiment, the backing 24 may also be of any of the aforementioned materials, but may preferably be relatively rigid, as the backing 24 supports the lower portion 16*b*' in the frame 14. If the backing 24 is formed of aluminum, it may be 0.064" thick, which thickness is also a commercially available thickness of sheet aluminum. The backing 24 may be secured directly to the upper side of the lower portion 16*b*, as by the bead 20 of glue. Alternatively, the lower portion 16*b*' may be secured to the backing 24 such as by drywall anchors, however finishing of the exposed side of the lower portion 16*b*' may be required. The backing 24** may be painted, such as white, to eliminate any undesirable shine showing through the 0.06" gap and provide a more finished look.

It is to be understood that this disclosure is not intended to limit the invention to any particular form described herein, but to the contrary, the invention is intended to include all modifications, alternatives and equivalents falling within the spirit and scope of the invention.

I claim:

1. A method of forming an access panel system for providing flush mounted access through a rough opening in a drywall ceiling into a space above the drywall ceiling, the drywall ceiling having an exterior facing surface, the access panel system comprising a frame and an associated layered access panel, the method comprising:

providing a first sheet of drywall having a thickness substantially the same as the thickness of the drywall ceiling;

utilizing a CNC milling machine having a bit to controllably mill a section from the first sheet of drywall to form the frame, the frame having a milled peripheral edge and a milled frame opening edge defining a frame opening within the frame, the milled peripheral edge dimensioned to fit into the rough opening in the drywall ceiling, the frame adapted to be substantially flush with the exterior facing surface of the drywall ceiling when installed in the drywall ceiling;

providing a second sheet of drywall having a thickness substantially the same as the thickness of the first sheet of drywall, the second sheet of drywall having a layer of drywall paper on opposing sides thereof;

utilizing the CNC milling machine having the bit or utilizing a second CNC milling machine having a bit to controllably mill a section from the second sheet of drywall to form a lower panel piece having a peripheral edge dimensioned to provide a controlled fit within the frame opening;

providing a third sheet of drywall, the third sheet of drywall having a layer of drywall paper on opposing sides of thereof;

utilizing the CNC milling machine having the bit, utilizing the second CNC milling machine having the bit or utilizing a third CNC milling machine having a bit to controllably mill a section from the third sheet of drywall to create an upper panel piece, the upper panel piece having a dimension relative to the lower panel piece to form a lip extending about the periphery of the upper panel piece, the lip adapted to rest on an upper surface of the frame; and glueing the upper panel piece to the lower panel piece to form the layered access panel;

wherein when the layered access panel is disposed in the frame opening, an exterior facing surface of the access panel is substantially flush with an exterior facing surface of the frame.

* * * * *